(12) United States Patent
Hillen et al.

(10) Patent No.: US 9,687,930 B2
(45) Date of Patent: Jun. 27, 2017

(54) SYSTEMS AND METHODS FOR NETWORKING, CONFIGURATION, CALIBRATION AND IDENTIFICATION OF WELDING EQUIPMENT

(71) Applicant: Lincoln Global, Inc., City of Industry, CA (US)

(72) Inventors: Edward Hillen, Painesville, OH (US); Michael Volzer, Fairport Harbor, OH (US); Nick Trinnes, Cleveland Heights, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 605 days.

(21) Appl. No.: 14/208,887

(22) Filed: Mar. 13, 2014

(65) Prior Publication Data

US 2014/0263247 A1    Sep. 18, 2014

Related U.S. Application Data

(60) Provisional application No. 61/795,000, filed on Mar. 15, 2013, provisional application No. 61/798,192, filed on Mar. 15, 2013, provisional application No. 61/798,915, filed on Mar. 15, 2013.

(51) Int. Cl.
*B23K 9/10* (2006.01)
*B23K 9/095* (2006.01)
*G07C 9/00* (2006.01)
*H04B 5/00* (2006.01)
(Continued)

(52) U.S. Cl.
CPC ............ *B23K 9/095* (2013.01); *B23K 9/0953* (2013.01); *B23K 9/1087* (2013.01); *B23K 9/32* (2013.01); *G07C 9/00111* (2013.01); *H04B 5/0025* (2013.01); *H04B 5/0031* (2013.01); *H04B 5/02* (2013.01); *Y10S 901/42* (2013.01)

(58) Field of Classification Search
CPC ......... B23K 9/095; B23K 9/0953; B23K 9/32
See application file for complete search history.

(56) References Cited

U.S. PATENT DOCUMENTS

| 5,278,390 A | 1/1994 | Blankenship |
| 5,370,290 A * | 12/1994 | Gilliland ................ B65H 51/32 226/108 |
| 5,500,512 A | 3/1996 | Goldblatt |

(Continued)

FOREIGN PATENT DOCUMENTS

| CN | 101193723 | 6/2008 |
| CN | 201741161 | 2/2011 |

(Continued)

OTHER PUBLICATIONS

International Search Report and Written Opinion from PCT/IB2014/000351 dated Nov. 5, 2014.

(Continued)

*Primary Examiner* — Geoffrey S Evans
(74) *Attorney, Agent, or Firm* — Calfee, Halter & Griswold LLP

(57) ABSTRACT

Methods and systems for using near field communication (NFC) protocol and logic to calibrate welding operations and systems are described. Further, methods and systems for using NFC logic and tags are described for networking, calibrating and linking components that comprise welding systems.

17 Claims, 9 Drawing Sheets

(51) Int. Cl.
*B23K 9/32* (2006.01)
*H04B 5/02* (2006.01)

(56) References Cited

U.S. PATENT DOCUMENTS

| | | | |
|---|---|---|---|
| 5,553,810 | A | 9/1996 | Bobeczko |
| 5,708,253 | A | 1/1998 | Bloch et al. |
| 5,862,071 | A | 1/1999 | Scholder |
| 6,064,314 | A | 5/2000 | Ozaki |
| 6,536,660 | B2 | 3/2003 | Blankenship et al. |
| 6,858,817 | B2 | 2/2005 | Blankenship et al. |
| 7,873,495 | B2 | 1/2011 | Lindell |
| 9,446,471 | B2 * | 9/2016 | Hillen ............... G07C 9/00111 |
| 2002/0168937 | A1* | 11/2002 | Clark ............... B23K 9/1062 455/41.1 |
| 2004/0004113 | A1 | 1/2004 | Blakenship |
| 2004/0026392 | A1* | 2/2004 | Feichtinger ............ B23K 9/095 219/130.5 |
| 2004/0099648 | A1* | 5/2004 | Hu ............... B23K 31/12 219/130.01 |
| 2005/0224466 | A1* | 10/2005 | Halvorsen ............ G05D 7/0635 219/74 |
| 2006/0169685 | A1 | 8/2006 | Stanzel |
| 2007/0015463 | A1* | 1/2007 | Abel ............... H04B 5/0031 455/41.1 |
| 2007/0080150 | A1* | 4/2007 | Albrecht ............... B23K 9/10 219/130.01 |
| 2008/0061049 | A1* | 3/2008 | Albrecht ............... B23K 9/0953 219/137 R |
| 2008/0090595 | A1* | 4/2008 | Liu ............... H04L 63/102 455/461 |
| 2008/0129457 | A1* | 6/2008 | Ritter ............... G07C 9/00087 340/10.1 |
| 2009/0170431 | A1* | 7/2009 | Pering ............... H04B 5/02 455/41.1 |
| 2010/0217440 | A1* | 8/2010 | Lindell ............... G05B 19/4183 700/275 |
| 2010/0274859 | A1* | 10/2010 | Bucuk ............... H04L 63/08 709/206 |
| 2011/0114616 | A1 | 5/2011 | Albrecht |
| 2011/0204034 | A1* | 8/2011 | Schartner ............... B23K 9/09 219/137 PS |
| 2011/0220630 | A1* | 9/2011 | Speilman ............ B23K 9/1336 219/137 R |
| 2012/0118980 | A1* | 5/2012 | Yoder ............... G01T 3/00 235/492 |
| 2012/0158235 | A1* | 6/2012 | Jaynes ............... B25J 9/1656 701/25 |
| 2013/0059534 | A1 | 3/2013 | Sobalvarro et al. |
| 2013/0119036 | A1* | 5/2013 | Daniel ............... B23K 9/095 219/130.21 |
| 2013/0200055 | A1* | 8/2013 | Enyedy ............... B23K 9/124 219/130.21 |
| 2013/0264319 | A1* | 10/2013 | Temby ............... B23K 9/095 219/130.1 |
| 2014/0124493 | A1* | 5/2014 | Enyedy ............... B23K 9/1006 219/137 PS |

FOREIGN PATENT DOCUMENTS

| | | | |
|---|---|---|---|
| CN | 102611483 | | 7/2012 |
| JP | 2006-247666 A | * | 9/2006 |
| JP | 2007-167915 A | * | 7/2007 |
| JP | 2007-310614 A | * | 11/2007 |
| JP | 2008-059116 A | * | 3/2008 |
| WO | 2007/101131 | | 9/2007 |
| WO | 2010/108235 | | 9/2010 |

OTHER PUBLICATIONS

Response to Office Action from U.S. Appl. No. 14/208,961 dated Jan. 6, 2016.
Office Action from U.S. Appl. No. 14/208,961 dated Mar. 15, 2016.
International Search Report and Written Opinion from PCT/IB2014/000357 dated Aug. 11, 2014.
International Preliminary Report on Patentability from PCT/IB2014/000351 dated Sep. 24, 2015.
International Preliminary Report on Patentability from PCT/IB2014/000357 dated Sep. 24, 2015.
Office Action from U.S. Appl. No. 14/208,961 dated Oct. 21, 2015.
Response to Office Action from U.S. Appl. No. 14/208,961 dated May 27, 2016.
Notice of Allowance from U.S. Appl. No. 14/208,961 dated Jul. 27, 2016.
Office Action from CN Application No. 201480029132.5 dated Sep. 1, 2016.
Miller et al., "What Every Engineer Should Know About Welding", Modern Steel Construction, May 1997, 10 pgs.
Digital Communications Technology, Lincoln Electric brochure, Nextweld, Mar. 2006, 12 pgs.
List of welding processes from Wikipedia, printed Mar. 15, 2013, 7 pgs.
Near field communication from Wikipedia, printed Mar. 4, 2013, 13 pgs.

* cited by examiner

SYSTEMS AND METHODS FOR NETWORKING, CONFIGURATION, CALIBRATION AND IDENTIFICATION OF WELDING EQUIPMENT

PRIORITY CLAIM

This application claims the benefit of and priority to three U.S. Provisional Patent Applications, Nos. 61/795,000, 61/798,192 and 61/798,915, which were all filed on Mar. 15, 2013. These three provisional applications are hereby incorporated by reference in full in this application.

FIELD

The general inventive concepts relate, among other things, to electric arc welding and, more particularly, to systems and methods for networking, configuring, calibrating and identifying welding-related equipment.

INCORPORATION BY REFERENCE

The following documents may be beneficial to a more thorough understanding and appreciation of the general inventive concepts set forth herein: U.S. Pat. No. 5,278,390 to Blankenship; U.S. Pat. No. 5,500,512 to Goldblatt; U.S. Pat. No. 5,553,810 to Bobeczko; U.S. Pat. No. 5,708,253 to Bloch et al.; U.S. Pat. No. 5,862,071 to Scholder; U.S. Pat. No. 6,536,660 to Blankenship et al.; and U.S. Pat. No. 6,858,817 to Blankenship et al.; the article entitled What Every Engineer Should Know about Welding Procedures, D. K. Miller (1997) (attached hereto as Appendix 1); and the publication entitled, Digital Communications Technology (Lincoln Electric 2006) (attached hereto as Appendix 2). Accordingly, each of these documents is hereby incorporated herein by reference in its entirety.

BACKGROUND

Near field communication, abbreviated NFC, is a known form of contactless communication between devices like smartphones or tablets. NFC encompasses a set of standards for such devices, which are often handheld or otherwise mobile, to establish radio communication with each other by touching them together or bringing them into close proximity, usually no more than a few centimeters. NFC peer-to-peer communication is possible provided both devices are powered. Communication is also possible between an NFC device and an unpowered NFC chip, often called a "passive tag" or simply a "tag."

NFC is a short-range, low-power communications protocol between two devices. An initiator device uses magnetic induction to create a radio-wave field that a target device can detect and access, allowing small amounts of data to be transferred wirelessly over a relatively short distance (e.g., less than 10 cm). More specifically, by using magnetic induction, the initiator device emits a small electric current, which creates a magnetic field that in turn bridges the physical space between the initiator device and the target device. The field is received by a similar coil in the target device, where it is turned back into electrical impulses to communicate data such as status information or any other information. So-called "passive" NFC tags use the energy from the initiator device to encode and provide their response, while "active" or "peer-to-peer" tags have their own power source and respond to the initiator device using their own electromagnetic fields. Thus, NFC transmissions typically encompass two modes. In a passive communication mode, the initiator device provides a carrier field and the target device answers by modulating the existing field. In this mode, the target device may draw its operating power from the initiator-provided electromagnetic field, thus making the target device a transponder. This transponder target device does not require a power supply to provide its signal to the active device when energized by the active device.

In an active communication mode, both the initiator device and the target device communicate by alternately generating their own fields. A device deactivates its radio frequency (RF) field while it is waiting for data. In this mode, both devices typically have power supplies.

NFC devices may be able to receive and transmit data at the same time. Accordingly, the devices can check for potential collisions, if the received signal frequency does not match with the transmitted signal's frequency.

NFC operates within the globally available and unlicensed radio frequency ISM band of 13.56 MHz. Most of the RF energy is concentrated in the allowed±7 kHz bandwidth range, but the full spectral envelope may be as wide as 1.8 MHz when using ASK modulation. The working distance with compact standard antennas may extend up to 20 cm, but the practical working distance is smaller.

NFC transmissions are generally secure due to their short range and support for encryption. Applications will often use higher-layer cryptographic protocols (e.g., SSL) to establish a secure channel. Because loss of an NFC device may present a security issue, such devices are typically protected by additional security, such as an authentication code.

The NFC standards cover communications protocols and data exchange formats, which offer a secure connection with relatively simple setup, and can be used to bootstrap more capable wireless connections, such as Bluetooth and Wi-Fi connections.

Application of NFC transmissions and related communications to welding systems and methods are contemplated by the general inventive concepts, as shown and described herein.

BRIEF SUMMARY

Figure 1:
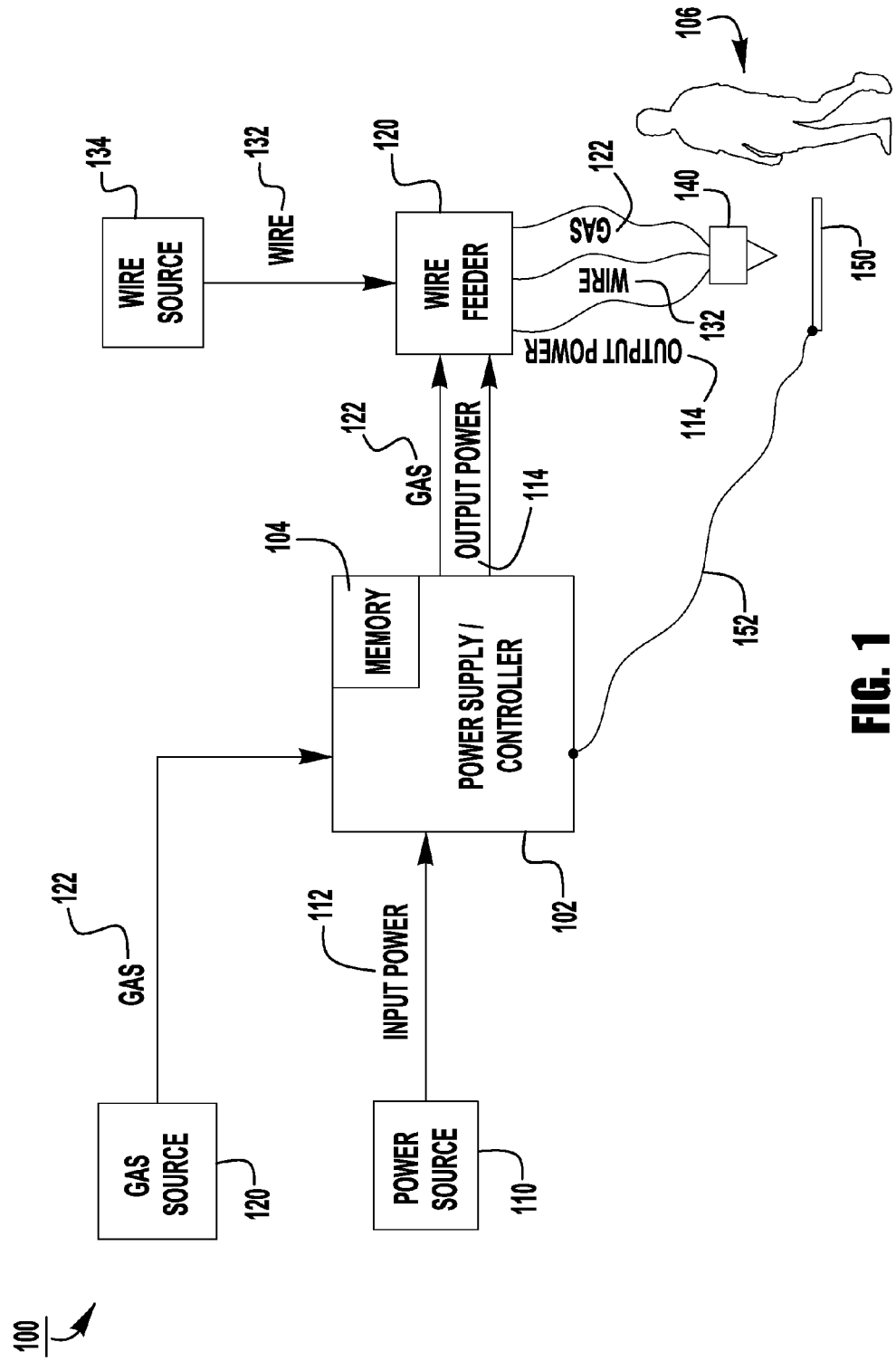
FIG. 1 is a schematic drawing of a MIG welding system.

Embodiments of methods and systems for using near field communication (NFC) protocol and logic to calibrate welding operations and systems are described and claimed. Further, methods and systems for using NFC logic and tags are described and claimed for networking, calibrating and linking components that comprise welding systems.

DETAILED DESCRIPTION

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein.

The following are definitions of various terms that may be used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or particular need(s), logic may include a software controlled microprocessor, discreet logic such as an application specific integrated circuit (ASIC), or other programmed logic device. In some instances, logic could also be fully embodied as software.

"Software" or "computer program" as used herein includes, but is not limited to, one or more computer or machine readable and/or executable instructions that cause a computer or other electronic device or logic to perform functions, initiate actions, and/or behave in a desired manner. The instructions may be embodied in various forms such as routines, apps, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, the requirements of a particular application, the environment it runs on, and/or the desires of a designer/programmer or the like.

"Computer" or "processing unit" as used herein includes, but is not limited to, any programmed or programmable electronic device that can store, retrieve, and process data.

Mobile application" or "mobile app" or "software application" or "application" or "app" as used herein, includes, but is not limited to, applications that run on smart phones, tablet computers, and other mobile or portable computing devices. The terms "mobile application" or "mobile app" or "software application" or "application" or "app" can be used synonymously with "software" or "computer program" or "application software." Mobile applications allow users to connect to services which are traditionally available on the desktop or notebook platforms. Typically, these services access the internet or intranet or cellular or wireless fidelity (Wi-Fi) networks, to access, retrieve, transmit and share data.

A "network" as used herein, includes, but is not limited to, a collection of hardware components and computers or machines interconnected by communication channels that allow sharing of resources and information, including without limitation, the worldwide web or internet.

"Operator" as used herein includes, but is not limited to, any individual actually performing a welding operation, as well as any individual supervising or otherwise responsible for a welding operation (whether manual or automatic).

"Portable computing devices" include, but are not limited to, computing devices which combine the powers of a conventional computer in portable environments. Exemplary portable computing devices include portable computers, tablet computers, internet tablets, Personal Digital Assistants (PDAs), ultra mobile PCs (UMPCs), carputers (typically installed in automobiles), wearable computers, and smartphones. The term "portable computing device" can be used synonymously with the terms "computer" or "processing unit."

Electric arc welding is a complicated process wherein numerous interrelated and non-interrelated parameters affect the deposition of molten metal to a weld pool in performing a welding operation. Accordingly, many modern electric arc welders include memory or similar structure for storing information useful for performing or otherwise controlling welding processes. The information can include, for example, information directly related to the welding process, such as parameters for controlling the welder, and/or information indirectly related to the welding process, such as information on an operator performing the welding process or information related to a wire being used in the welding process. Systems and methods for efficiently, reliably, and securely inputting such information are desirable.

The general inventive concepts contemplate systems and methods which use NFC active and/or passive devices to read, write, and/or store information within a welding system, including amongst various components of the welding system (e.g., a power supply/controller) and operators thereof.

Metal inert gas (MIG) welding, a subset of gas metal arc welding (GMAW), is one type of electric arc welding. MIG welding is a welding process in which an electric arc forms between a consumable wire electrode and workpiece metals, causing the metals, along with the wire, to melt and join. Along with the wire electrode, a shielding gas is often fed through a welding gun or torch to shield the process from contaminants (e.g., oxygen, nitrogen) in the air. While the various exemplary embodiments set forth herein may be directed to one or more specific types of welding processes, the general inventive concepts are not intended to be limited to these specific types of welding processes and may find applicability with any suitable welding process.

A conventional MIG welding system 100 is shown in FIG. 1. In the MIG welding system 100, a welding unit (welder) 102 functions as a power supply and controller for a welding process. The welder 102 includes a memory 104 or similar logic for storing information relating to the welding process. For example, the information could be stored in the memory by an operator 106 manually programming or otherwise interacting with the welder 102.

The welder 102 is connected to a power source 110 that supplies the necessary input power 112 to operate the welder 102. The welder 102 may condition the input power 112 to produce a consistent or otherwise controlled output power 114 suitable for the welding process.

The welder 102 is also connected to a gas source 120 that supplies a shielding gas 122 for the welding process. A gas regulator may be used to regulate a pressure of the shielding gas 122 for controlled delivery to the welder 102.

The welder 102 is also connected to a wire feeder 130. The wire feeder 130 receives a welding wire 132 from a wire source 134, such as a spool or barrel of wire. The wire feeder 130 includes a motor or the like for paying out the welding wire 132 to a welding torch 140, gun, or the like. The wire feeder 130 may advance the welding wire 132 in response to action by the operator 106, such as the operator 106 pressing a switch on the torch 140.

In the illustrated embodiment, the output power 114 and/or the shielding gas 122 are also fed (e.g., using cables) through the wire feeder 130 to the welding torch 140. In another embodiment, the output power 114 and/or the shielding gas 122 can be fed directly from the welder 102 to the welding torch 140.

At least one workpiece 150 to be welded is also provided. The workpiece 150 is connected to the welder 102 by a ground cable 152 or the like.

Figure 2:
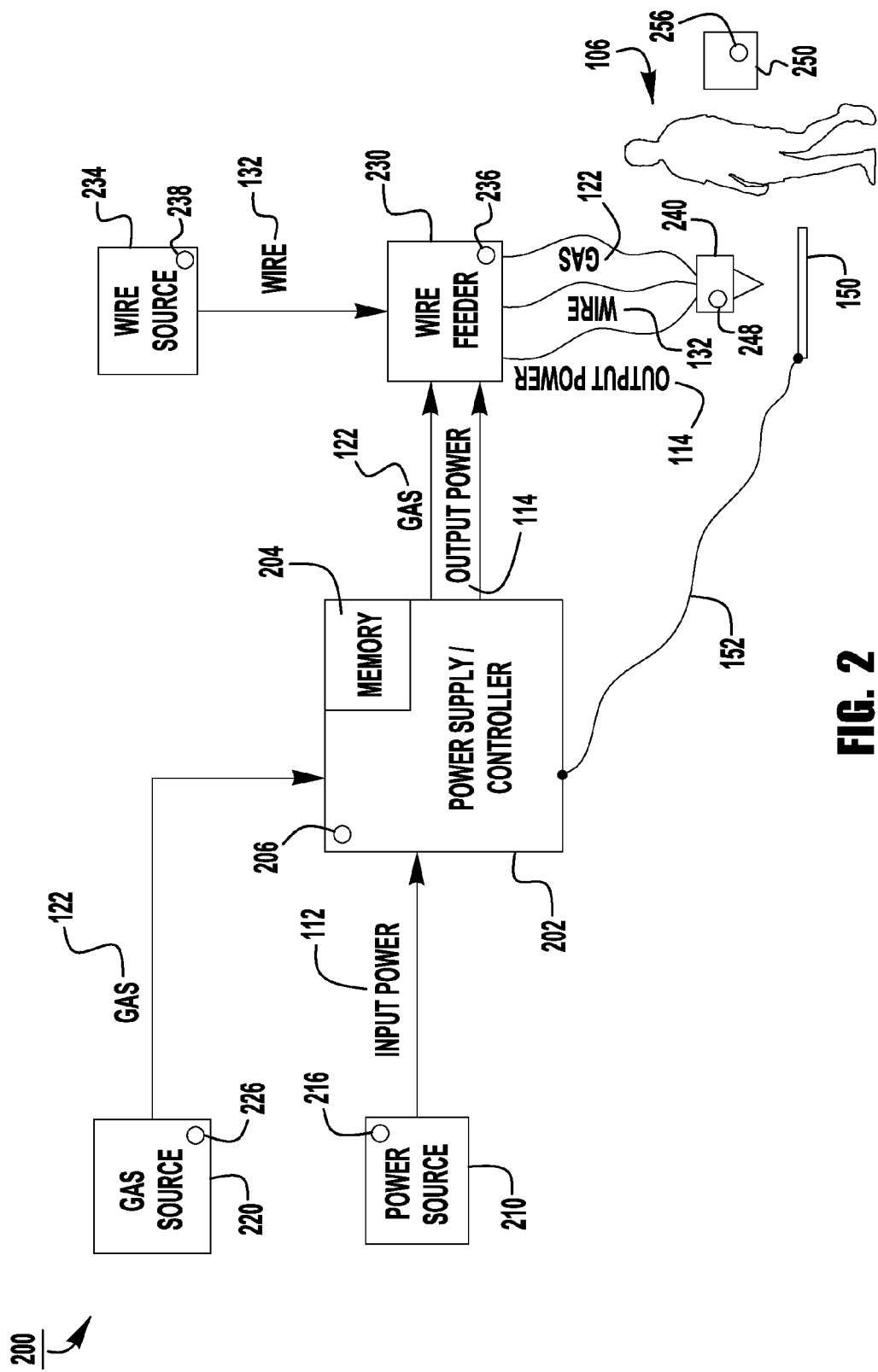
FIG. 2 is an embodiment of a welding system incorporating NFC logic and NFC capable devices.

A MIG welding system 200, according to one exemplary embodiment of the general inventive concepts, is shown in FIG. 2. As described herein, one or more components of the MIG welding system 200 are NFC-capable components. Accordingly, data can be read from and/or written to these components resulting in a more dynamic and more connected and interactive welding system.

In the MIG welding system 200, a welding unit (welder) 202 functions as a power supply and controller for a welding process. The welder 202 can include a processing unit (not shown) for implementing and/or assisting with these (and other) functions. The processing unit can be an internal component of the welder 202, or an external component which the welder 202 accesses (e.g., over a network).

The welder 202 also includes a memory 204 or similar logic for storing information relating to the welding process. The information can be stored in the memory at any time. For example, the information could be stored in the memory 204 when the welder 202 is manufactured. As another example, the information could be stored in the memory 204 or otherwise updated after installation of the welder 202, such as by the operator 106.

The welder 202 can include NFC logic 206 including any related logic, software, structure, and the like, such as a power supply. The NFC logic 206 renders the welder 202 capable of sending and/or receiving NFC transmissions.

The welder 202 is connected to a power source 210 that supplies the necessary input power 112 to operate the welder 202. The welder 202 may condition or otherwise alter the input power 112 to produce a consistent or otherwise controlled output power 114 suitable for the welding process.

The power source 210 can include NFC logic 216 including any related logic, software, structure, and the like, such as a power supply. The NFC logic 216 renders the power source 210 capable of sending and/or receiving NFC transmissions.

The welder 202 is also connected to a gas source 220 that supplies a shielding gas 122 for the welding process. A gas regulator (not shown) may be used to regulate a pressure of the shielding gas 122 for controlled delivery to the welder 202.

The gas source 220 can include NFC logic 226 including any related logic, software, structure, and the like, such as a power supply. The NFC logic 226 renders the gas source 220 capable of sending and/or receiving NFC transmissions.

The welder 202 is also connected to a wire feeder 230. The wire feeder 230 receives a welding wire 132 from a wire source 234, such as a spool or barrel of wire. The wire feeder 230 includes a motor or the like for paying out the welding wire 132 to a welding torch 240, gun, or the like. The wire feeder 230 may advance the welding wire 132 in response to action by the operator 106, such as the operator 106 pressing a switch on the welding torch 240. In an automated (e.g., robotic) installation, the wire feeder 230 can automatically advance the welding wire 132 in accordance with a computer program or the like associated with the welding process.

The wire feeder 230 can include NFC logic 236 including any related logic, software, structure, and the like, such as a power supply. The NFC logic 236 renders the wire feeder 230 capable of sending and/or receiving NFC transmissions.

The wire source 234 can include NFC logic 238 including any related logic, software, structure, and the like, such as a power supply. The NFC logic 238 renders the wire source 234 capable of sending and/or receiving NFC transmissions.

The torch 240 can include NFC logic 248 including any related logic, software, structure, and the like, such as a power supply. The NFC logic 248 renders the torch 240 capable of sending and/or receiving NFC transmissions.

In one exemplary embodiment, the output power 114 and/or the shielding gas 122 are also fed (e.g., using cables) through the wire feeder 230 to the welding torch 240. In one exemplary embodiment, the output power 114 and/or the shielding gas 122 are fed directly from the welder 202 to the welding torch 240.

At least one workpiece 150 to be welded is also provided. The workpiece 150 is connected to the welder 202 by a ground cable 152 or the like.

Any other components of or related to the MIG welding system 200 can include NFC logic including any related logic, software, structure, and the like, such as a power supply. For example, a device 250 associated with the operator 106 can include such NFC logic 256. In one exemplary embodiment, the device 250 is portable so that it can be carried around a work site by the operator 106. In one exemplary embodiment, the device 250 includes a processing unit that provides additional functionality, such as the ability to make phone calls, receive e-mails, take pictures, etc. The NFC logic (e.g., the NFC logic 256) renders the component (e.g., the device 250) capable of sending and/or receiving NFC transmissions. The device 250 can for example be a portable computing device.

The general inventive concepts contemplate welding systems, such as the MIG welding system 200, which include at least one NFC-enabled component. In this manner, the welding systems include at least one component for which data can be read from and/or written to, resulting in enhanced, dynamic welding systems.

Figure 4:
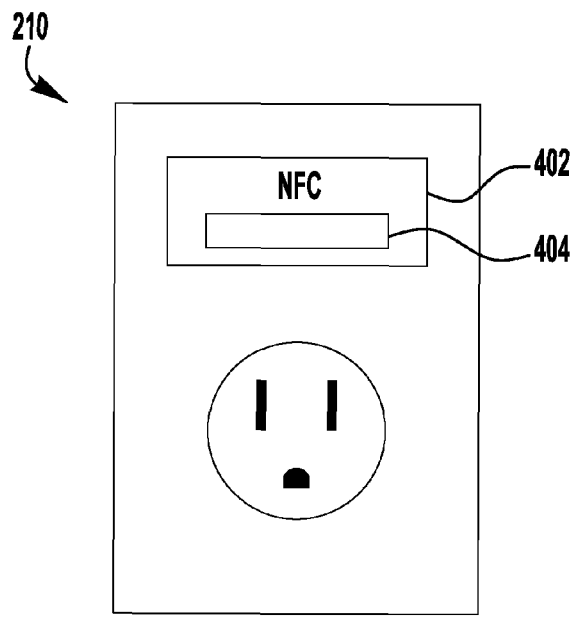
FIG. 4 is a schematic drawing of a power source including an NFC tag.

In one exemplary embodiment, the power source 210 includes passive NFC logic 402 (see FIG. 4). The NFC logic 402 can take any suitable form. In one exemplary embodiment, the NFC logic 402 is a tag, sticker, or the like. In one exemplary embodiment, the tag is affixed to an outer surface of the power source 210. The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 402 allows power source information 404 to be stored at or otherwise associated with the power source 210. The power source information 404 can include any information on the power source 210, such as its output power capabilities and calibration information. The power source information 404 can be accessed by the initiator device 310 and used, for example, to verify that the power source 210 is capable of safely (i.e., rated for) providing sufficient output power for the welding process. If some deficiency or other issue is identified with the power source 210, the welding process can be prevented or otherwise delayed until said deficiency is remedied.

Figure 5:
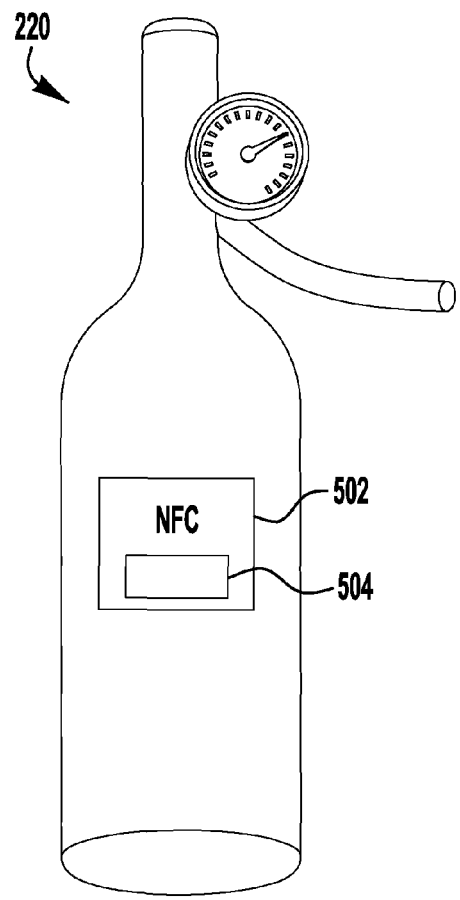
FIG. 5 is a schematic drawing of a gas source including an NFC tag.

In one exemplary embodiment, the gas source 220 includes passive NFC logic 502 (see FIG. 5). The NFC logic 502 can take any suitable form. In one exemplary embodiment, the NFC logic 502 is a tag, sticker, or the like. In one exemplary embodiment, the tag is affixed to an outer surface of the gas source 220 (e.g., one or more tanks containing the shielding gas 122). The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 502 allows gas source information 504 to be associated with the gas source 220. The gas source information 504 can include any information on the gas source 220, such as a composition of the shielding gas 122 provided thereby. The gas source information 504 can be accessed by the initiator device 310 and used, for example, to determine whether the shielding gas 122 provided by the gas source 220 is proper for the particular welding process. If some deficiency or other issue is identified with the shielding gas 122, the welding process can be prevented or otherwise delayed until said deficiency is remedied.

Figure 6:
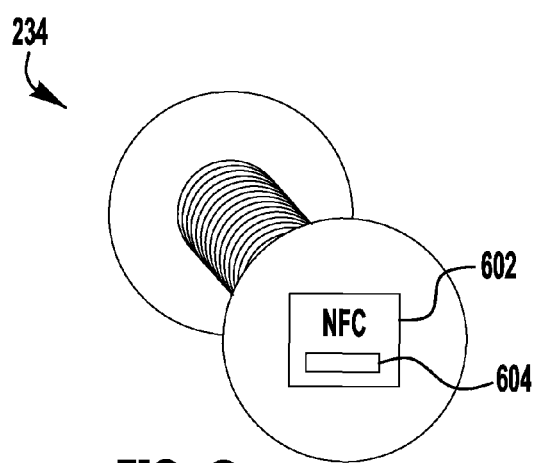
FIG. 6 is a schematic drawing of a wire source including an NFC tag.

In one exemplary embodiment, the wire source 234 includes passive NFC logic 602 (see FIG. 6). The NFC logic 602 can take any suitable form. In one exemplary embodiment, the NFC logic 602 is a tag, sticker, or the like. In one exemplary embodiment, the tag is affixed to an outer surface of the wire source 234 (e.g., a spool containing the welding wire 132). The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 602 allows welding wire information 604 to be associated with the wire source 234. The welding wire information 604 can include any information on the wire source 234, such as a composition and/or size (e.g., diameter) of the welding wire 132 provided thereby. The welding wire information 604 can be accessed by the initiator device 310 and used, for example, to determine whether the welding wire 132 provided by the wire source 234 is suitable for the particular welding process. If some deficiency or other issue is identified with the welding wire 132, the welding process can be prevented or otherwise delayed until said deficiency is remedied.

Figure 7:
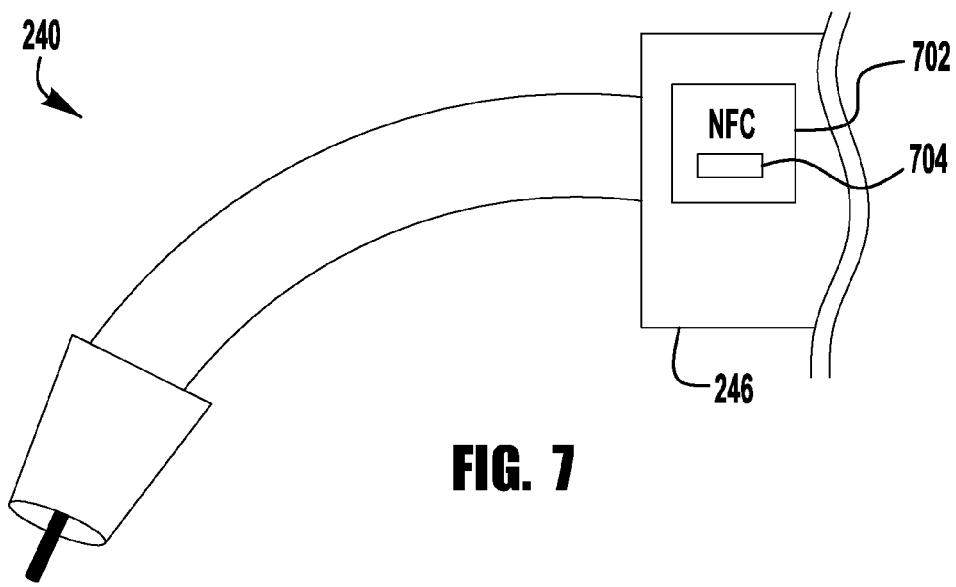
FIG. 7 is a schematic drawing of a welding torch including an NFC tag.

In one exemplary embodiment, the welding torch 240 includes passive NFC logic 702 (see FIG. 7). The NFC logic 702 can take any suitable form. In one exemplary embodiment, the NFC logic 702 is a tag, sticker, or the like. In one exemplary embodiment, the tag is affixed to an outer surface of the welding torch 240 (e.g., on in proximity to a handle 246 of the welding torch 240). The tag may be protected from the harsh welding conditions encountered near the welding torch 240 in any suitable manner. For example, the tag can be made from or otherwise surrounded by a heat resistant material to compensate for the harsh welding conditions. As another example, the tag can be disposed behind a removable panel or the like of the welding torch 240 in order to shield the tag from the harsh welding conditions. The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 702 allows torch information 704 to be associated with the welding torch 240. The torch information 704 can include any information on the welding torch 240, such as a maintenance history of the welding torch 240. The torch information 704 can be accessed by the initiator device 310 and used, for example, to determine whether the welding torch 240 is in a satisfactory condition for performing the particular welding process. If some deficiency or other issue is identified with the welding torch 240, the welding process can be prevented or otherwise delayed until said deficiency is remedied.

Figure 8:
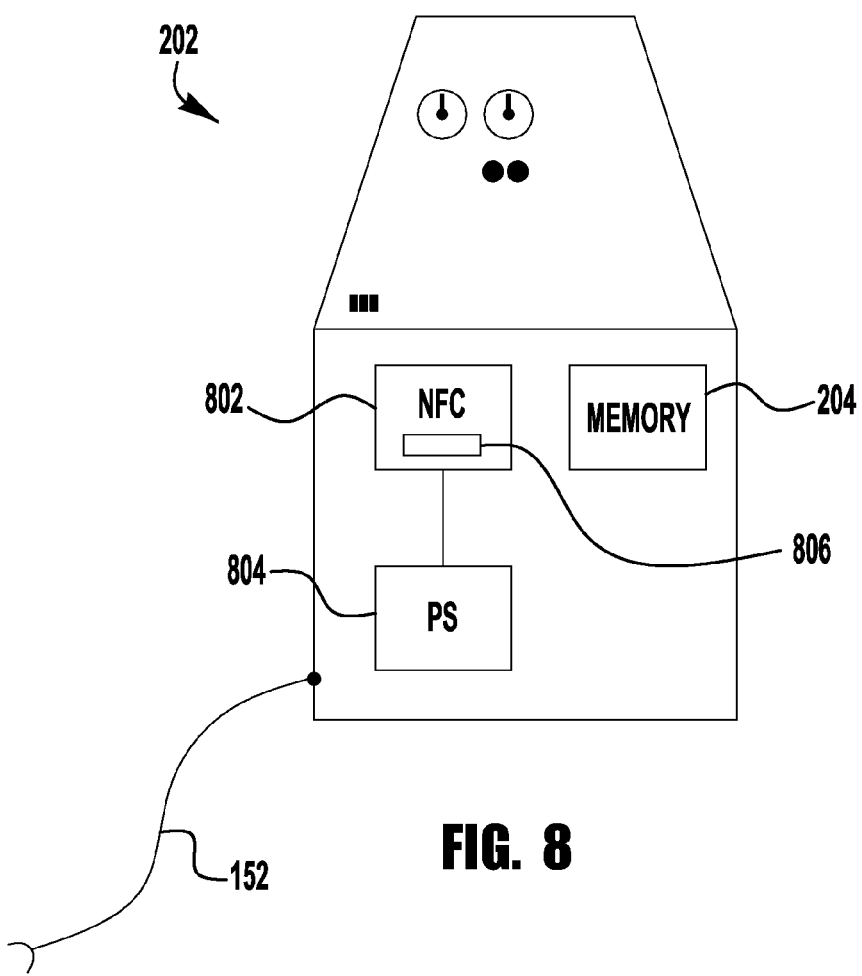
FIG. 8 is a schematic drawing of a welder including an NFC tag.

In one exemplary embodiment, the welder 202 includes active NFC logic 802 (see FIG. 8). The NFC logic 802 can take any suitable form. In one exemplary embodiment, the NFC logic 802 is a tag, sticker, or the like. In one exemplary embodiment, the tag is affixed to an outer surface of the welder 202 (e.g., a frame of the welder 202). The tag is readily visible to and accessibly by a user (e.g., the operator 106).

As an active device, the tag has a dedicated power supply 804 (e.g., one or more batteries) which powers its NFC logic 802. In this manner, the tag can function as both an initiator device, such as the initiator device 310, and an active target device 330 (see FIG. 3B).

The target device 330 has its own power supply 332. The target device 330 further includes NFC logic 334 which can generate an electromagnetic field 336 similar to the electromagnetic field 306 generated by the initiator device 310. In this manner, the target device 330 and the initiator device 310 can engage in peer-to-peer communications with one another. Otherwise, when the target device 330 acts as strictly as a target device, it functions in a manner similar to the target device 302 shown in FIG. 3A.

Figure 3A:
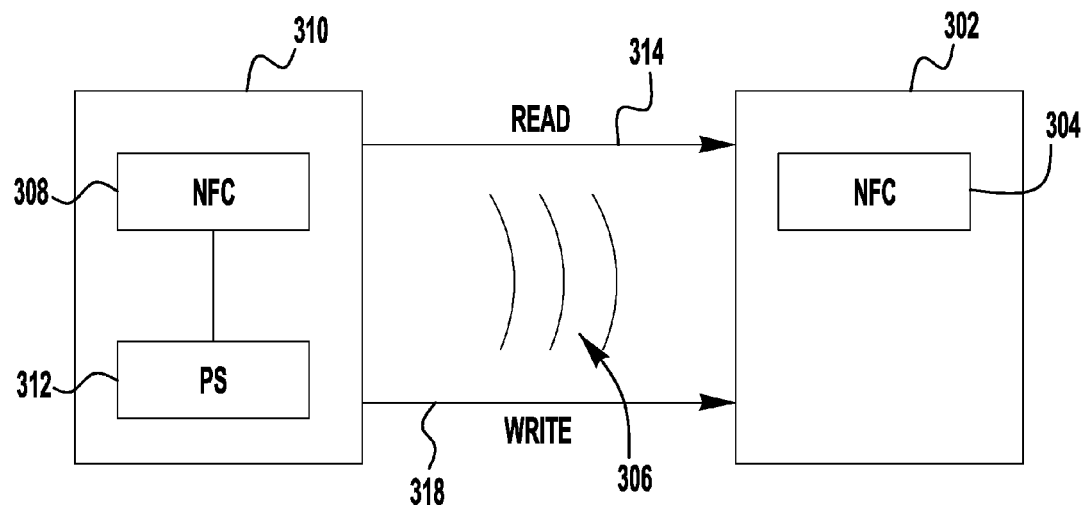
FIGS. 3A and 3B are schematic drawings of passive and active NFC devices or tags, respectively.
Figure 3B:
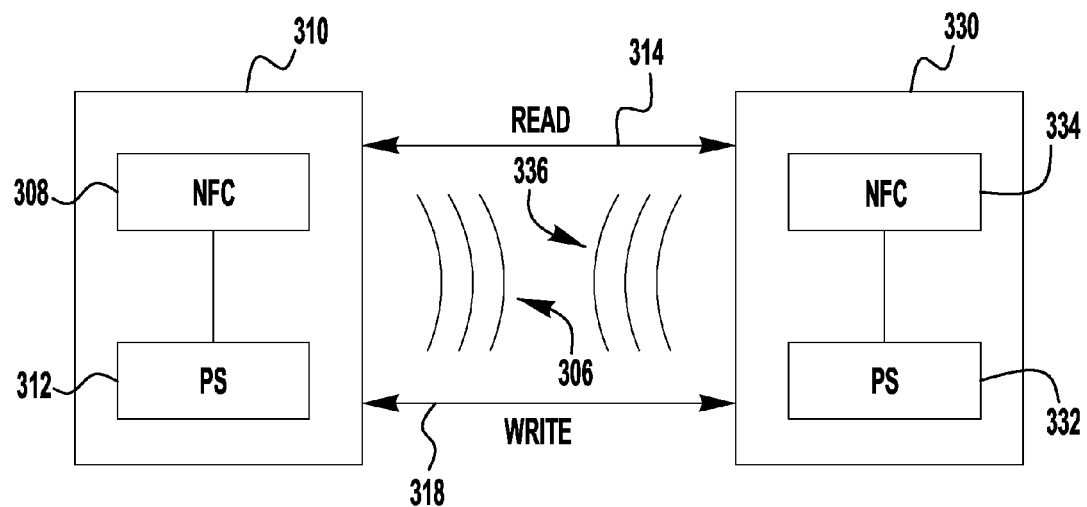

Conversely, when the target device 330 acts as an initiator device or a combination initiator-target device, it functions in a manner similar to the initiator device 310 shown in FIG. 3A. For example, the target device 330 uses read instructions 314 communicated by its field 336 to read information stored on or otherwise associated with the other device (e.g., the initiator device 310). The read instructions 314 may be implemented by an NFC application (not shown) running on the target device 330. In one exemplary embodiment, the target device 330 uses write instructions 318 communicated by its field 336 to write information to the other device. The write instructions 318 can also be implemented or otherwise managed by the NFC application running on the target device 330.

When the target device 330 acts as the initiator device 310, the welder 202 can use the NFC logic 802 to read data from and/or write data to another component of the MIG welding system 200 (as a target device). When the target device 330 acts as the target device 302, the welder 202 can use the NFC logic 802 to store welder information which can be read and/or written by another component of the MIG welding system 200 (as an initiator device). Accordingly, the welder 202 can participate in peer-to-peer communications with other components of the MIG welding system 200, including any operators (e.g., operator 106) thereof.

The active NFC logic 802 allows welder information 806 to be associated with the welder 202. The welder information 806 can include the power source information 404, the gas source information 504, the welding wire information 604, the torch information 704, and/or the wire feeder information 906, as well as any other information relating to the welding process, other components of the MIG welding system 200, and/or operators thereof.

The welder information 806 can be accessed by any initiator device 310 and used, for example, to determine the requirements and/or parameters associated with a particular welding process. If some deficiency, issue, problem, or the like, is identified from the welder information 806, the welding process can be prevented or otherwise delayed until said deficiency is remedied. In one exemplary embodiment, the deficiency is remedied automatically by the welding component representing the initiator device 310.

Figure 9:
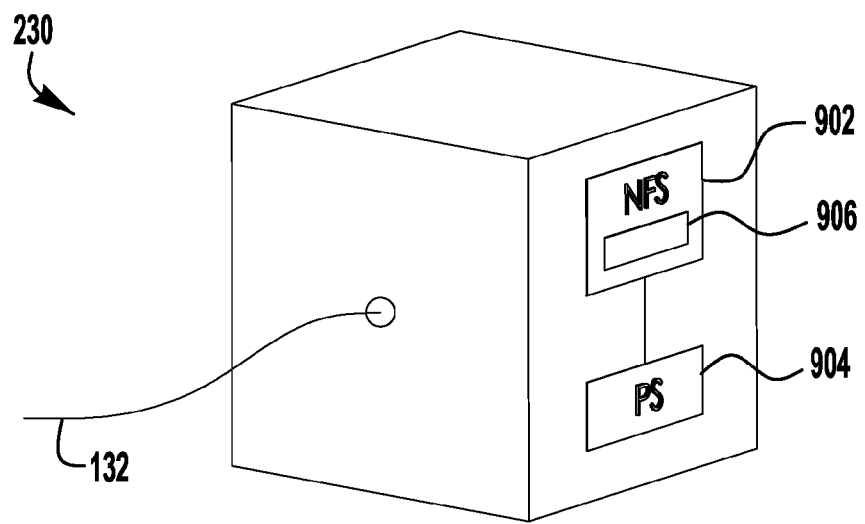
FIG. 9 is a schematic drawing of a wire feeder including an NFC tag.

In one exemplary embodiment, other components of the MIG welding system 200, instead of or in addition to the welder 202, can be active devices. For example, the wire feeder 230 includes active NFC logic 902 (see FIG. 9). The NFC logic 902 can take any suitable form. In one exemplary embodiment, the NFC logic 902 is a tag, sticker, or the like. In one exemplary embodiment, the tag is affixed to an outer surface of the wire feeder 230 (e.g., a housing of the wire feeder 230). The tag is readily visible to and accessibly by a user (e.g., the operator 106).

As an active device, the tag has a dedicated power supply 904 (e.g., one or more batteries) which powers its NFC logic 902. In this manner, the tag can function as both an initiator device, such as the initiator device 310, and an active target device 330 (see FIG. 3B).

The target device 330 has its own power supply 332. The target device 330 further includes NFC logic 334 which can generate an electromagnetic field 336 similar to the electromagnetic field 306 generated by the initiator device 310. In this manner, the target device 330 and the initiator device 310 can engage in peer-to-peer communications with one another. Otherwise, when the target device 330 acts as strictly as a target device, it functions in a manner similar to the target device 302 shown in FIG. 3A.

Conversely, when the target device 330 acts as an initiator device or a combination initiator-target device, it functions in a manner similar to the initiator device 310 shown in FIG. 3A. For example, the target device 330 uses read instructions 314 communicated by its field 336 to read information stored on or otherwise associated with the other device (e.g., the initiator device 310). The read instructions 314 may be implemented by an NFC application (not shown) running on the target device 330. In one exemplary embodiment, the target device 330 uses write instructions 318 communicated by its field 336 to write information to the other device. The write instructions 318 can also be implemented or otherwise managed by the NFC application running on the target device 330.

When the target device 330 acts as the initiator device 310, the wire feeder 230 can use the NFC logic 902 to read data from and/or write data to another component of the MIG welding system 200 (as a target device). When the target device 330 acts as the target device 302, the wire feeder 230 can use the NFC logic 902 to store wire feeder information which can be read and/or written by another component of the MIG welding system 200 (as an initiator device). Accordingly, the wire feeder 230 can participate in peer-to-peer communications with other components of the MIG welding system 200, including any operators (e.g., operator 106) thereof.

The active NFC logic 902 allows wire feeder information 906 to be associated with the wire feeder 230. The wire feeder information 906 can include the power source information 404, the gas source information 504, the welding wire information 604, the torch information 704, and/or the welder information 806, as well as any other information relating to the welding process, other components of the MIG welding system 200, and/or operators thereof. The wire feeder information can also include the calibrated wire feed speed of the wire for the particular welding operation.

The wire feeder information 906 can be accessed by any initiator device 310 and used, for example, to determine the requirements and/or parameters associated with a particular welding process. If some deficiency, issue, problem, or the like, is identified from the wire feeder information 906, the welding process can be prevented or otherwise delayed until said deficiency is remedied. In one exemplary embodiment, the deficiency is remedied automatically by the welding component representing the initiator device 310.

In one exemplary embodiment, limitations of the wire feeder 230 can be communicated to the welder 202 via the wire feeder information 906, such that only those welding processes for which the wire feeder 230 is suitable would be displayed or otherwise made available to the operator 106.

Figure 10:
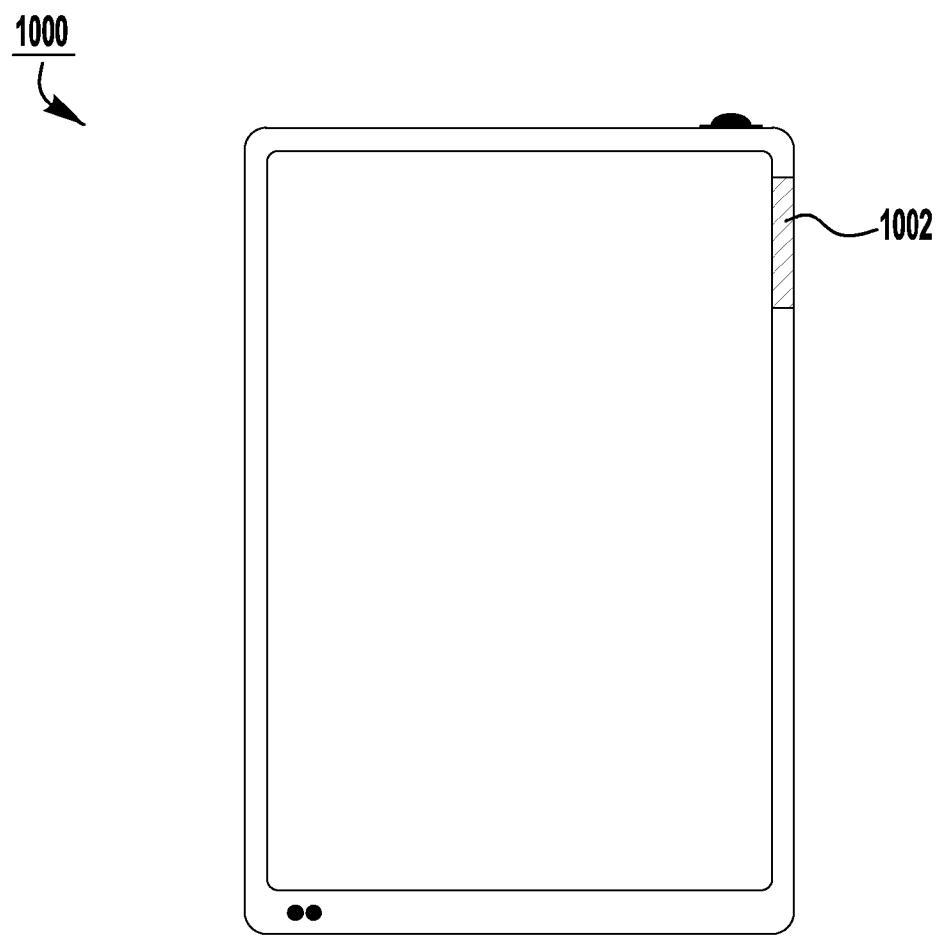
FIG. 10 is a schematic drawing of an operator device including active NFC logic.
Figure 11:
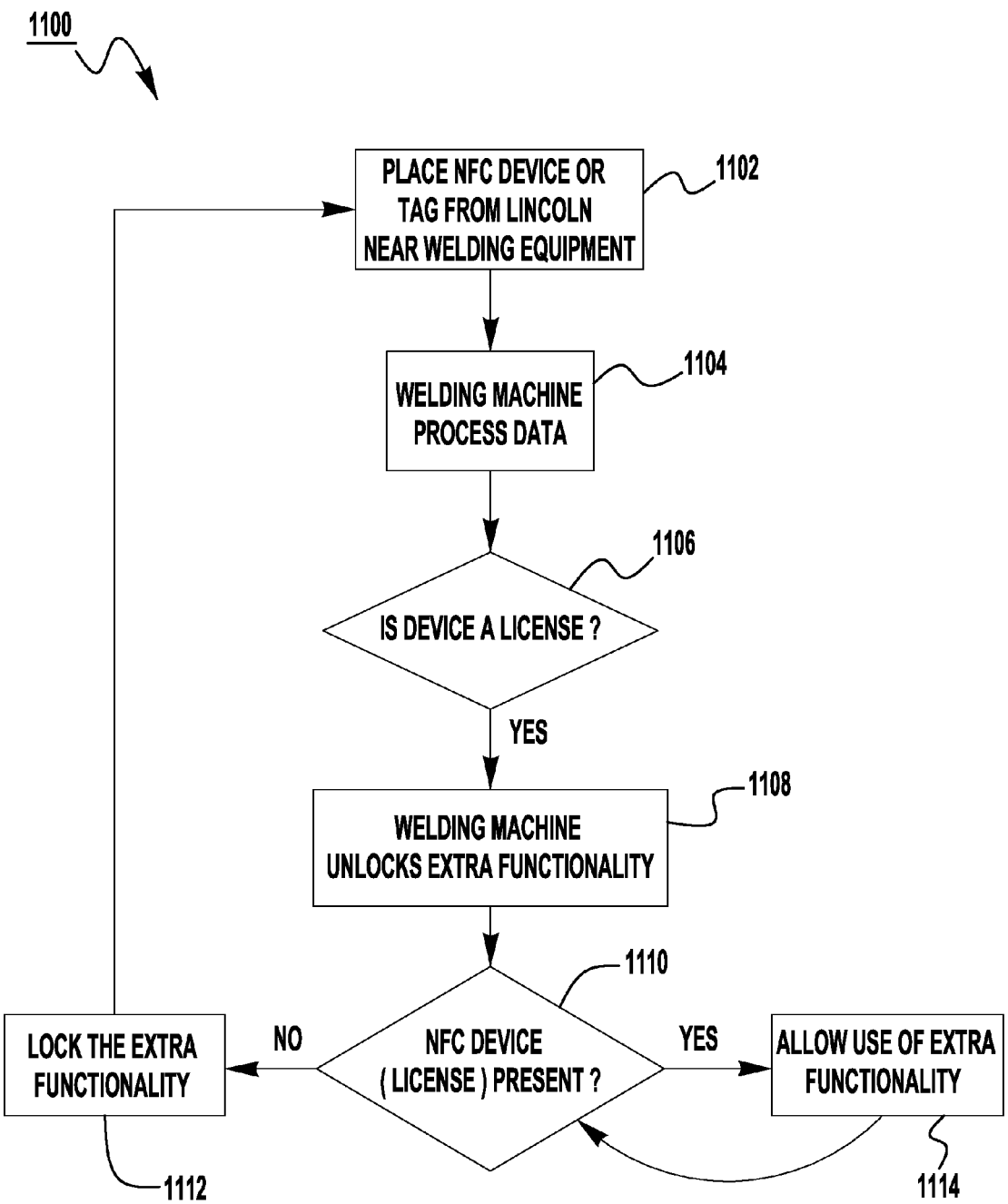
FIG. 11 is a logic flow chart of a process for limiting access to certain welder functions using NFC logic.

In one exemplary embodiment, an operator device 1000 associated with the operator 106 includes active NFC logic 1002 (see FIG. 10). In one exemplary embodiment, the NFC logic 1002 is embedded in or otherwise integrated with the operator device 1000. In one exemplary embodiment, the NFC logic 1002 is implemented as an add-on component to the operator device 1000. For example, the operator device 1000 can be provided with NFC capability by interfacing the NFC logic 1002 with the device, such as by plugging it into a port, expansion slot, or the like of the device. The general inventive concepts contemplate that other components of a welding system (e.g., the MIG welding system 200) could be retrofit with NFC capability in a similar manner.

The operator device 1000 also includes an NFC application or app (not shown), which is software facilitating communications between the operator 106 and the various NFC-enabled components of the MIG welding system 200. For example, the NFC application can provide a user interface, as well as manage the exchange of data between NFC-enabled devices. The NFC application could be downloaded to the operator device from a website or an app store website.

In one exemplary embodiment, the operator device 1000 is a mobile computing device. In one exemplary embodiment, the operator device 1000 is a smartphone. In one exemplary embodiment, the operator device 1000 is a portable computer. In one exemplary embodiment, the operator device 1000 is a tablet (see FIG. 10).

In one exemplary embodiment, the operator device 1000 is a relatively fixed computer. In this case, it may be necessary to bring an NFC-enabled component (e.g., a spool of wire including NFC logic) to the operator device 1000 in order for communications between the operator device 1000 and the component to be possible. In this case, the operator device 1000 may be able to share data with other components of the MIG welding system 200 (e.g., the welder 202) by means of a network, such as a wired or wireless Ethernet network.

One of ordinary skill in the art will appreciate that any number or combination of components in the MIG welding system 200 can be NFC-enabled. Furthermore, each such component can be configured for either passive or active NFC. Accordingly, the operator device 1000 can generally be used by the operator 106 to read data from and/or write data to any of the NFC-enabled welding components of the MIG welding system 200, such as the welder 202, the power source 210, the gas source 220, the wire feeder 230, the wire source 234, and the welding torch 240.

In one exemplary embodiment, the operator device 1000 can include authentication information which is used to implement or otherwise enforce access control in a welding system (e.g., the MIG welding system 200). For example, NFC tags are placed on one or more components of the welding system. The NFC tags include control information which defines access limits or requirements for the components. When the operator device 1000 is brought into proximity with any of the components, an NFC session is established to determine whether the authentication information on the operator device 1000 satisfies the access limits or requirements set forth in the control information of the component. In one exemplary embodiment, the operator 106 initiates the NFC session manually (e.g., by pressing a button, icon, or the like on the operator device 1000).

If the authentication information on the operator device 1000 satisfies the access limits or requirements set forth in the control information of the component, then the operator 106 possessing the operator device 1000 is granted access to the component. Here, access to the component can mean any level of access, such as only reading data from the component, reading data to and writing data from the component, and/or actual use of the component for its intended purpose. Indeed, the control information for a component of the welding system can set forth different levels of access, with the operator 106 only being able to access the component consistent with a level of access that can be established using the authentication information of the operator device 1000. If the authentication information on the operator device 1000 fails to satisfy the access limits or requirements set forth in the control information of the component, then the operator 106 utilizing the operator device 1000 is denied access to the component or any access to the component by the operator 106 is appropriately limited.

Furthermore, the use of information on the operator device 1000 can be extended to implement specific access control measures.

For example, in one exemplary embodiment, the operator device 1000 is uniquely associated with a particular operator (e.g., the operator 106). The operator device 1000 can include operator information relating to the operator 106, such as the operator's qualifications to perform a particular welding process.

The operator information can be used in any suitable manner within the MIG welding system 200. For example, the operator information can be used by the welder 202 and/or welding torch 240 to determine whether the operator 106 is certified to perform a particular welding process. If it is determined that the operator 106 lacks the requisite certification, the welder 202 and/or welding torch 240 could prevent the operator 106 from performing the welding process, such as by disabling equipment necessary for performing the welding process (e.g., the welder 202 and/or the welding torch 240).

According to the method 1100, an NFC device (e.g., the operator device 1000) or other NFC tag is brought in close proximity to welding equipment (e.g., the welder 202) by a user (e.g., the operator 106) at 1102. In one exemplary embodiment, close proximity means within 10 cm.

The welding equipment uses NFC to obtain data from the NFC device which is then processed at 1104. In particular, the data is evaluated to determine whether the NFC device constitutes a license at 1106. If it is determined that the NFC device does not constitute a valid license directed to licensed technology of the welding equipment, further processing halts (i.e., the method 1100 resets) and the user is denied access to the welding equipment and/or additional functionality covered by the license. Conversely, if it is determined that the NFC device does constitute a valid license directed to licensed technology associated with the welding equipment, processing continues to 1108. In 1108, access to the welding equipment and/or additional functionality, as the licensed technology, is made available to the user.

Thereafter, the method 1100 evaluates whether the NFC device remains in close proximity to the welding equipment at 1110. If it becomes the case that the NFC device is no longer in close proximity to the welding equipment, then the user is denied further access to the welding equipment and/or additional functionality at 1112 and further processing halts (i.e., the method 1100 resets).

On the other hand, as long as the NFC device remains in close proximity to the welding equipment, the user can continue to use the licensed welding equipment and/or additional functionality. In particular, steps 1110 and 1114 form a loop which is constantly or periodically checked to confirm that access to the welding machine or additional functionality, as the licensed technology, should remain available to the user.

In a welding system including NFC-enabled components, such as the MIG welding system 200, the capabilities of the welding system and underlying components can be extended to provide an enhanced welding system. For example, using NFC, the components of the welding system can store or otherwise be associated with information, and that information can readily be accessed and used by other components of the welding system. NFC tags present a low-cost solution to adding information to "dumb" devices (i.e., those lacking a dedicated processing unit), such as a spool of wire. For passive NFC tags, no dedicated power source is needed and the tags can have a relatively small footprint. Furthermore, operators of the welding system can readily configure and exchange data with the NFC-enabled components, as well as implement various access control mechanisms. Further still, the NFC transmissions between components and/or operators of the welding system are relatively secure owing to their requirement of close proximity and use of encryption and/or other protection mechanisms. Thus, the general inventive concepts extend to any number of welding systems (such as automated, manual, hard automated or semi-automated systems) and all welding processes, including, without limitation, MIG, TIG, GMAW, gas brazing, submerged ARC welding, flux-cored welding, and any other welding processes and methods (a non-exhaustive list of welding processes for which this invention could be used is provided in the attached Appendix 3, which is incorporated herein in its entirety). NFC can be used to enhance the overall capabilities of any of these welding systems and methods.

Figure 12:
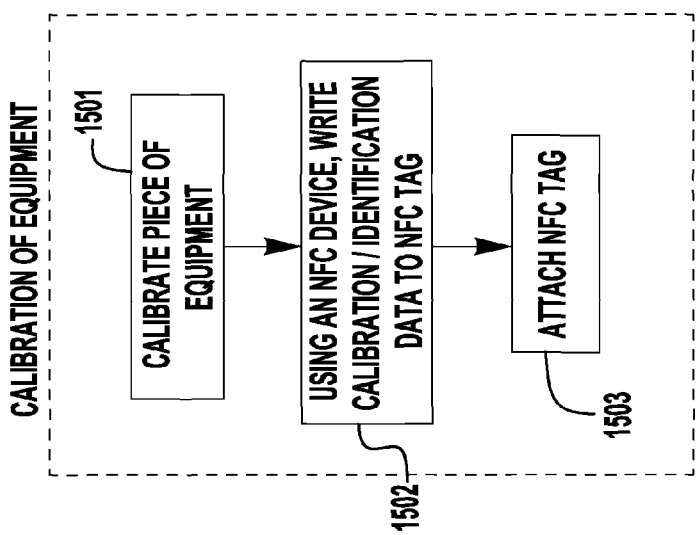
FIG. 12 is a logic flow chart of a process for securing calibration data to welding devices that comprise a welding system.

In one exemplary embodiment the software or logic flow of the embodiment is depicted in FIG. 12. FIG. 12 depicts a calibration method using NFC tags or logic and an NFC enabled device such as a portable computing device.

In a welding system such as, for example, system 200 in FIG. 2, several pieces of welding equipment must be calibrated at the manufacturing site of the welding equipment and then perhaps re-calibrated or calibrated together at the site of installation and use of the welding system 200. For example, a motor that will be used to pull welding wire or "push" welding wire will have a calibrated motor speed, gear ratio, power rating, torque and tension related to acting on the wire. All of this information will be calibrated first at the site of the manufacture of the welding equipment. It could also be changed in the field. A motor is conventionally a "dumb" device with no means of storing this calibration information on the device itself where it is readily accessible. However, if the motor has a passive NFC tag this calibration information can be stored on the device itself and can be accessed by an active NFC device such as a portable computing device.

Referring to FIG. 12, an exemplary method for calibration of equipment using NFC enabled device and tags is described. In block 1501, a piece of welding equipment is calibrated by an operator in the manufacturing facility of the piece of welding equipment. In block 1502 an NFC enabled device such as a portable computing device is used to write calibration and identification information into a passive or active NFC tag. This is done by entering the calibration information into the portable computing device, bringing the portable computing device in close proximity to the NFC tag and activating a calibration write action through the NFC app or software in the portable computing device. For a motor or welding gun or any other typically "dumb" piece of welding equipment the tag will normally be passive tag. In block 1503, the tag is attached to the calibrated piece of welding equipment such as a motor, welding gun or power supply. This NFC tag can be attached to the welding equipment by any means including wire, a hang tag, adhesive etc. However, the NFC tag could also be formed into the wall or cover of the piece of the equipment, for example the sheet steel that acts as a cover for a piece of the equipment could have an opening into which the NFC tag or a plastic part or plate to which the NFC tag is attached fits or is molded.

Figure 13:
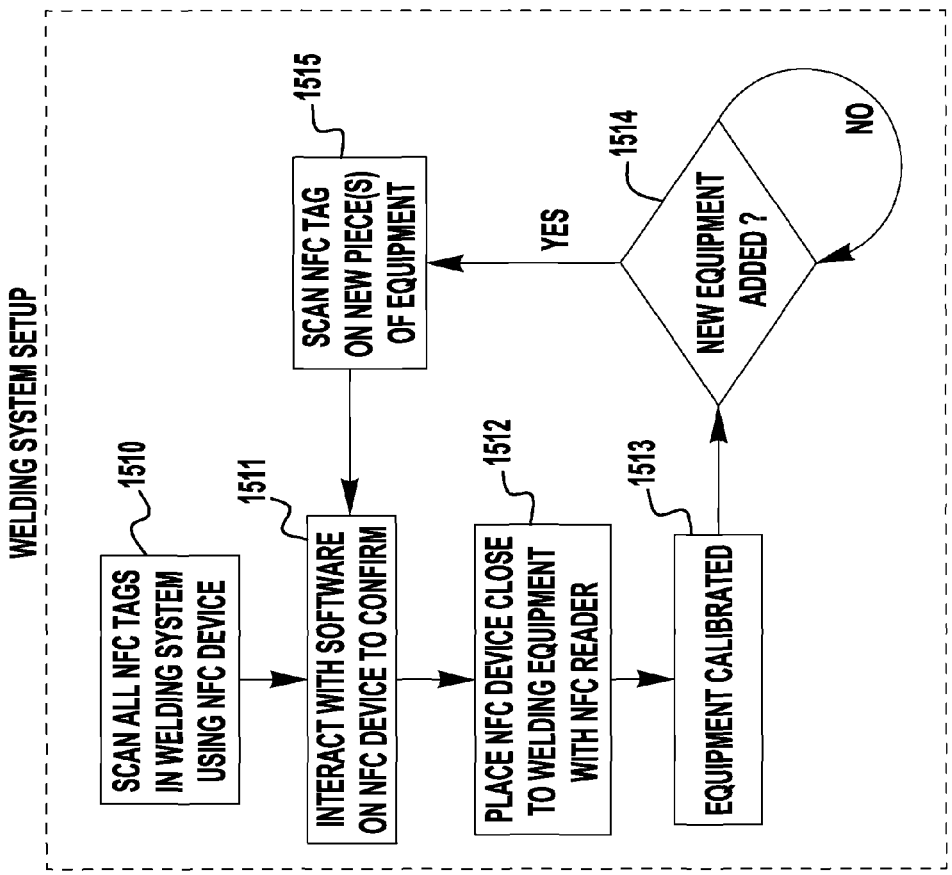
FIG. 13 is a logic flow chart of a method for setting up and calibrating a welding system using NFC devices.

Referring now to FIG. 13, a method for calibrating an entire welding system such as for example depicted in FIG. 200 is shown. In a typical welding system, several pieces of welding equipment must be calibrated or initialized together. For example, a welding gun and a wire feeder with a pushing motor and a pulling motor for the wire must be calibrated together to yield the optimum speed, torque and tension in order for the welding wire to yield the highest quality weld output. However, as mentioned above, these devices are often "dumb" pieces of equipment with no memory or means for storing their initial calibration data either at the factory or when the system was initially set up. Further, using a conventional computer to store calibration data for an entire welding system has many problems in that human errors in data entry and the human memory are not reliable. In addition, storing data in a central computer or laptop does not give an operator access to the calibration data on the manufacturing floor where the welding system and equipment are actually located.

The welding system calibration/setup method described in FIG. 12 provides a system in which calibration and set-up data is present and remains with the specific equipment of the system and can be immediately accessed in the close proximity of the welding equipment. In block 1510, when the all the welding equipment for a particular welding system arrives at the installation location for the welding system, the operators scan all of the NFC tags on the welding equipment to obtain calibration information stored at the manufacturing facility. This scanning step can be performed by any NFC enabled computing device including a portable computing device. In block 1511, the NFC app on the portable computing device is used to confirm the calibration and identification data for all the equipment obtained in the scan and modify this data if needed. For those pieces of welding equipment which must be calibrated together to operate in an optimum manner on-site as discussed above or any device that must be recalibrated, the calibration data is entered into the NFC computing device by the operator in block 1511. Then the NFC portable computing device is placed in the proximity of the NFC tag of the equipment to be calibrated in block 1512. In block 1513 the NFC software or logic on the portable computing device writes the calibration data to the tags of the devices to be calibrated on site by executing a write command. For NFC active tagged welding equipment, the equipment itself can be automatically calibrated by receiving the calibration data from the NFC portable computer. For passive tagged equipment the calibration data is stored in the tag.

The blocks 1514 and 1515 provide a loop in the method described in FIG. 12 that allows for new equipment to be added to the welding system and be calibrated using the NFC tags. In block 1514 if new equipment is added to the system, the NFC tag is scanned for the calibration data on the NFC tags for calibrations that may have been performed at the manufacturing facility. This data is then confirmed or modified if necessary at step 1511 and written back to the NFC tag of the new equipment in blocks 1512 and 1513.

The calibration data is now stored in or with each piece of equipment that comprises a welding system such as, for example, the welding system described in FIG. 2. It can be accessed at any time by bringing an active NFC computing device in the close proximity of the tags attached to each piece of equipment. Further, there is no need for any other data storage or data entry and the calibration data for a particular piece of welding equipment can be obtained simply by presenting the NFC device in the close proximity of the tag. If desired by the system operator, there is no need to enter any identification codes or any other identification information to access the calibration or identification information. In this case, the operator being in the close proximity of the NFC tags with the NFC computing device can act as a level of security. In addition, those devices that are "dumb," will have the calibration data stored at the device without the need for providing power to a passive NFC tag at the device.

In another exemplary embodiment all of these same advantages discussed above can be realized. This exemplary embodiment relates to setting up or configuring the network on which a welding system operates and connecting welding equipment to the network. All devices that comprise a welding system, such as for example, the welding system described in FIG. 2 must be networked together on some type of network or multiple networks to communicate to one another and to operate as a single welding system. One type of network used for welding systems is the ArcLink™ system manufactured and designed by Lincoln Electric, which is described in the publication attached hereto as Appendix 2. Other networks that could be used in combination with the ArcLink™ system to connect a welding system together and facilitate its function include Wi-Fi, ethernet, Bluetooth or CAN networks or any other known communication or industrial networks. Any of these networks can be used individually or together to create welding system networks.

When a piece of welding equipment is connected to any network, the welding equipment must have a unique identification means, number or address that the network uses to identify and locate that particular piece of equipment. The conventional way for identifying welding equipment on a network is to have a physically operated dip switch mounted within the welding equipment that creates a unique number or address on the network. These dip switches are operated manually and usually are internal to a piece of welding equipment under a sheet metal cover or another type of covering. These dip switches are difficult to use and are time consuming to change and operate.

Figure 14:
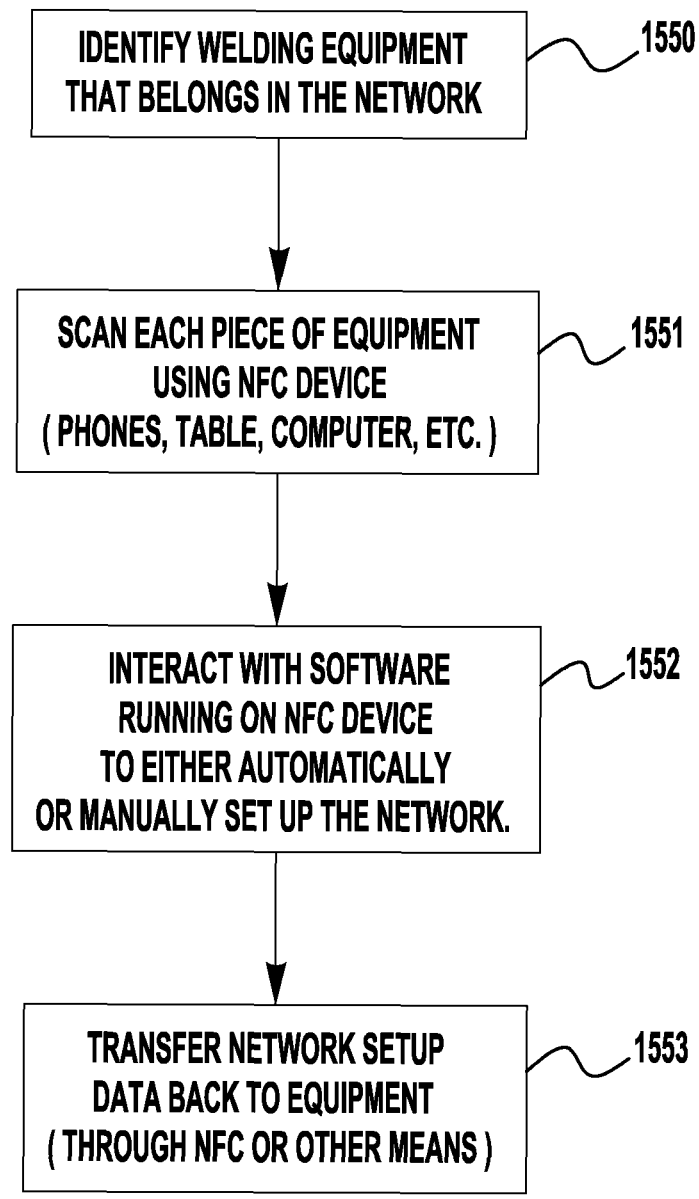
FIG. 14 is a logic flow chart of a method for configuring a network for a welding system using NFC tags.

In this exemplary embodiment, NFC tags or logic on welding equipment can be used to connect welding equipment to the network and to network two or more pieces of welding equipment together. This method is depicted in FIG. 14. The first logic block 1550 of this method is to identify all of the items of welding equipment that will be linked to a particular network to comprise a welding system. Then an NFC enabled computer including a portable computing device is used to scan the NFC tags or logic of each device to obtain the identity data of each piece of welding equipment in block 1551. Then in block 1552 the network is created. This can be done manually by connecting the physical welding equipment items to the network as they will be arranged in the welding system physical location, or automatically by using a software program to configure the welding system network. After the locations of the welding equipment are determined by setting up the system, network location data or addresses are transmitted to each welding device through the NFC enabled computing device in block 1553 by bringing the computing device in the close vicinity of the NFC tag and executing write commands to the NFC tags in each device. Accordingly, all of the welding equipment items will have a network location obtained through NFC communications and stored in each piece of equipment's NFC tag.

In another exemplary embodiment, some items of welding equipment must be linked together and be able to identify each other, for example a robot controller must be linked to the particular robots that it controls; and a welding power supply must be linked to a motor controller or a particular welding robot. The NFC tags or logic on each piece of equipment and an NFC enabled computing device such as a portable computing device can be used to link these devices together in a similar manner as described above with respect to FIG. 14.

In this exemplary embodiment, an NFC enabled portable computing device can be brought in the close vicinity of the devices that are being linked together; and a command linking them together and providing the identities or addresses on the network of the devices to which they are linked can be sent to and stored in the NFC tag of each device. In addition, because close physical proximity of the NFC computing device to the NFC tags is required in this method, the physical location of the equipment linked together can be part of the data provided to each linked piece of equipment either manually or automatically. Accordingly, not only a network address of a piece of equipment, but the physical location of each piece of linked equipment can also be stored in each NFC tag of each piece of linked equipment. This type of information is very valuable in troubleshooting and controlling welding operations through a network with many robots, welders, motors and welding operations.

The embodiments described herein are only exemplary and do not limit in any way the invention or the claims that will be added. The claims will have all of their full and ordinary meanings, unlimited by this specification.

What is claimed is:

1. A welding system comprising:
 a welder including a power supply;
 a wire feeder;
 a welding torch;
 a first NFC tag attached to the welder that stores calibration data for the power supply;
 a second NFC tag attached to the wire feeder that stores calibration data for the wire feeder; and
 a third NFC tag attached to the welding torch that stores calibration data for the welding torch.

2. The welding system of claim 1, wherein at least one of the first NFC tag, the second NFC tag, and the third NFC tag is passive.

3. The welding system of claim 1, wherein at least one of the first NFC tag, the second NFC tag, and the third NFC tag is active.

4. The welding system of claim 1, further comprising a motor for pushing or pulling welding wire to the welding torch.

5. The welding system of claim 4, wherein a fourth NFC tag is attached to the motor and stores calibration data for the motor.

6. The welding system of claim 1, wherein at least one of the calibration data for the power supply, the calibration data for the wire feeder, and the calibration data for the welding torch is written into the corresponding NFC tag with a portable computing device.

7. The welding system of claim 1, further comprising a shielding gas source.

8. The welding system of claim 7, wherein a fourth NFC tag is attached to the shielding gas source and stores calibration data for the shielding gas source.

9. A method of calibrating components of a welding system, the method comprising:
attaching to a first component of the welding system a first NFC tag for storing first calibration data for the first component to which the first NFC tag is attached;
attaching to a second component of the welding system a second NFC tag for storing second calibration data for the second component to which the second NFC tag is attached;
scanning the first NFC tag attached to the first component to read the first calibration data;
scanning the second NFC tag attached to the second component to read the second calibration data;
calibrating the first component using the first calibration data; and
calibrating the second component using the second calibration data.

10. The method of claim 9, further comprising:
writing modified calibration data into the NFC tag of the at least one of the first component and the second component by placing a portable computing device in the proximity of the NFC tag attached to the at least one component.

11. The method of claim 10, further comprising encrypting the modified calibration data.

12. The method of claim 9, wherein at least one of the first component and the second component is a motor.

13. The method of claim 9, wherein at least one of the first component and the second component is a wire feeder.

14. The method of claim 9, wherein at least one of the first component and the second component is a welder power supply.

15. The method of claim 9, wherein scanning the first NFC tag attached to the first component to read the first calibration data comprises placing a portable computing device in the proximity of the first NFC tag, and
wherein scanning the second NFC tag attached to the second component to read the second calibration data comprises placing the portable computing device in the proximity of the second NFC tag.

16. The method of claim 9, wherein at least one of the first component and the second component is a welding torch.

17. A method of assigning welding devices addresses on a network, the method comprising:
linking a first welding device to a second welding device, the first welding device being a robot and the second welding device being a robot controller;
attaching a separate NFC tag to each welding device;
scanning the NFC tag attached to each welding device to obtain identification data for each welding device;
assigning a unique network address to each welding device; and
for each welding device, writing data corresponding to the unique network address into the NFC tag attached to the welding device,
wherein the identification data of the robot includes information identifying the robot controller, and
wherein the information identifying the robot controller includes the physical location of the robot controller.

* * * * *